W. M. RICHARDS.
INSTRUMENT FOR CENTERING, MARKING, AND TESTING LENSES.
APPLICATION FILED DEC. 9, 1909.
1,026,124.
Patented May 14, 1912.
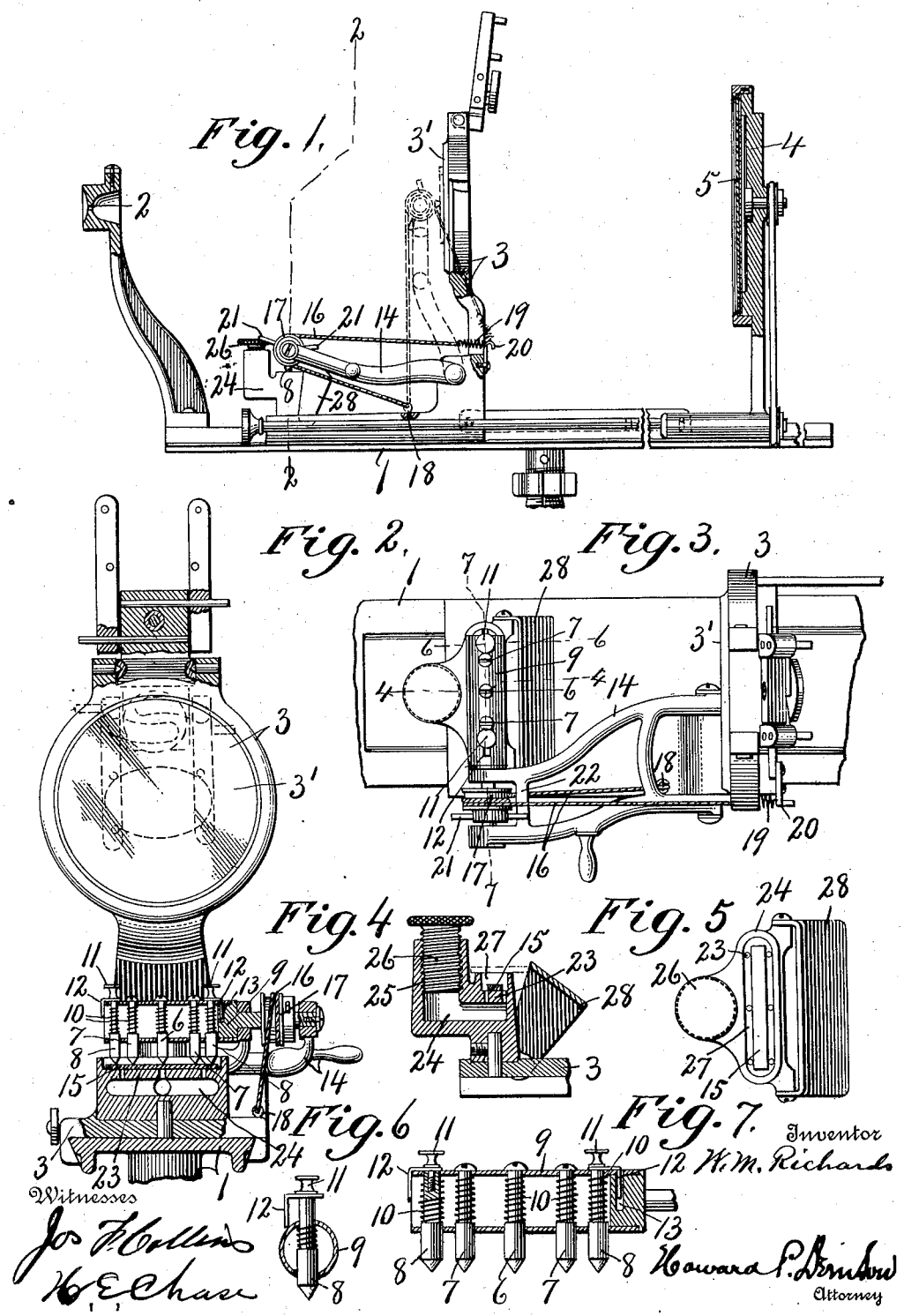

UNITED STATES PATENT OFFICE.

WILLIAM MARTIN RICHARDS, OF NEW YORK, N. Y., ASSIGNOR TO THE STANDARD OPTICAL COMPANY, OF GENEVA, NEW YORK, A CORPORATION OF NEW YORK.

INSTRUMENT FOR CENTERING, MARKING, AND TESTING LENSES.

1,026,124.     Specification of Letters Patent.     Patented May 14, 1912.

Application filed December 9, 1909. Serial No. 532,260.

*To all whom it may concern:*

Be it known that I, WILLIAM M. RICHARDS, of 229 West Ninety-seventh street, New York, in the county of New York, in the State of New York, have invented new and useful Improvements in Instruments for Centering, Marking, and Testing Lenses, of which the following, taken in connection with the accompanying drawings, is a full, clear, and exact description.

This invention relates to certain improvements in instruments for centering, marking and testing lenses similar to that set forth in Patent No. 790,059 to C. W. Howland, issued May 16, 1905, except that it refers more particularly to the marking mechanism including the ink reservoir and marking pins.

It frequently happens that in drilling, mounting or adjusting the lenses of spectacles and eyeglasses, their correct relative positions will be altered to such an extent as to throw their optical axes from their normal prescribed positions thereby causing excessive strain of the eyes and other resultant physical discomforts even though the lenses themselves may be in exact accordance with the prescription. This condition is more often the direct result of incorrect drilling of the screw holes for the mounting and in order that the lenses may be properly fitted to the eyes the screw holes in both must be disposed in a straight horizontal line to conform to the oculist's tests and prescription. If the lenses themselves are in accordance with what has been prescribed and the drill holes are improperly positioned it then becomes necessary to readjust the lenses in the mounting or to readjust the mounting until the optical axes are so positioned as to relieve the eyes or produce the desired vision.

The main object of my invention is not only to mark the lenses so that they may be accurately positioned in the edge grinding machine and that the drill holes may be properly positioned but also to test, mark and properly fit the lenses to the eyes by adjusting the lenses or frames after mounting.

A further object is to render the marker more effective by protecting the ink pad against accumulation of dust and other foreign matter therein and also by preventing undue evaporation of the ink.

Other objects and uses will be brought out in the following description.

In the drawings: Figure 1 is a longitudinal sectional view of a lens testing and marking instrument embodying the features of my invention. Fig. 2 is a transverse sectional view of the same taken in line 2—2, Fig. 1. Fig. 3 is an enlarged top plan of the detached marker and inking device. Fig. 4 is a sectional view of the ink reservoir taken on line 4—4, Fig. 3. Fig. 5 is a top plan of the ink reservoir shown in Fig. 4. Figs. 6 and 7 are sectional views of the marker taken on lines 6—6 and 7—7, Fig. 3.

In illustrating the operation of my invention I have shown a supporting bed or table —1— upon which is mounted a sight tube —2—, a lens rest —3— and a target support —4— all of which parts are the same as described and claimed in the patent previously referred to and are disposed coaxially or with their centers in the same straight line.

The lens rest and target support are adjustable along the bed toward and from the sight tube to get the desired focus, the lens rest being located between the target and sight tube and preferably comprises a transparent glass disk —3'— and supporting frame therefor disposed at right angles to the line of sight.

The target support contains a target —5— which is rotatable and suitably graduated to permit an accurate determination of the optical characteristics of any lens which may be placed flatwise against the glass disk —3'— in the position in which it is to be used with its major axis in a horizontal line and its optical center coaxial with that of the target and sight tube.

The marker proper, exclusive of the inking device presently described, comprises a series, in this instance five marking points or pins —6—, —7— and —8—, which are yieldingly mounted side by side in the same straight line in and upon a rotary head or hollow shaft —9— to rotate therewith and also to move radially thereof by and against the action of suitable springs —10—. The center pin —6— determines and marks the optical center on the lens while the pins —7— which are located at opposite sides of the center pin determine and mark the horizontal or major axis of such lens. The outer or end pins —8— serve to mark two points on the lens, corresponding in position to the sight openings in the positioning apparatus shown in Patent No. 944,846, December 28, 1909, to B. F. Clark, preparatory for insertion in an edge grinding machine, while the pins —7— serve to mark two additionel points close to or inside of those produced by the pins —8— so that when the lenses are mounted the additional points on both lenses will be in the same horizontal straight line as the optical axis according to prescription. In all cases however the marking is done while the lens is under test in the centering device of the patent referred to so that there may be no mistake in determining and marking the location of the major axis on the lens or in establishing the correct relative position of the lenses in the mounting.

In the ordinary marking of finished lenses it is only necessary to use the three pins, viz., the center pin and opposite pins —7—, in which case it is desirable to temporarily displace the outer end pins —8— from their marking positions and for this purpose each of the end pins —8— is provided with a draw knob or hand piece —11— and an offset detent —12— for holding the corresponding pins in their operative and inoperative positions. For example, the detent —12— nearest the operating means is adapted to be moved into and out of a radial slot or recess —13— in the spindle head —9—, while the other detent —12— is slidably engaged with the adjacent end face of the same head, the object in both instances being to prevent turning of the pins when in operative position. On the other hand, when the pins —8— are withdrawn upwardly by the hand piece —11— against the action of their retracting springs —10— sufficiently to withdraw their respective detents from the position shown in Fig. 7, such pins with the detent thereon are turned a quarter turn and allowed to engage the periphery of the head —9—, as shown in Fig. 6, to hold the points of the pins some distance above the marking plane of the points of the pins —6— and —7—, thereby allowing the latter pins to produce the desired marks upon the lens and preventing the pins —8— from performing a similar function.

The head —9— is journaled at one end in a vertically swinging frame —14— which is operated by hand from a substantially horizontal position shown by full lines in Figs. 1, 3 and 4 to a vertical position shown by dotted lines in Fig. 1, said frame being pivotally mounted upon the lens supporting frame.

When the frame —14— is in a horizontal position, the pins —6—, —7— and —8— are disposed in a vertical position with their points in contact with an inking pad —15—, as shown in Fig. 2, but when the frame is rocked upwardly and rearwardly the head —9— with the pins thereon are rotated a quarter turn thereby moving the pins from a vertical position from the inking pad to a horizontal position with their ink points in contact with the lens which has been previously adjusted and held in proper position against the transparent glass plate —3'—, the sweep of the pins being such as to bring their points in the same horizontal plane coincident with the axis of the lens and line of vision through the sight tube —2— and center of the target —5—. This rotation of the head —9— during the rocking movement of the frame —14— back and forth is effected by means of a cable —16— passing over a pulley or sheave —17— on the outer end of the head —9— one end of the cable being secured to an anchor —18— on the lens supporting frame —3—, while the other end is yieldingly connected by a spring —19— to an anchor —20— on the same frame. The degree of rotation of the head is limited by stop pins —21— which engage a cross bar —22— on the swinging frame —14— as the head is rotated in opposite directions.

*Inking mechanism.*—The inking mechanism comprises the inking pad —15— of suitable size mounted in a horizontal position upon a perforated supporting bed —23— of an ink reservoir —24—. This reservoir is mounted upon the base of the lens supporting frame —3— to move forward and backward along the main supporting bed —1— and is provided with an inlet or piston chamber —25— in which is movable a screw piston or cap —26— which may be adjusted when desired to force the ink from the reservoir through the perforated supporting plate —23— and onto the inking pad —15—. This inking pad rests within a recess —27— open at the top and of sufficient area to permit the points of the pins to readily enter and contact with the pad without friction. In order that the pad may be protected from the accumulation of dust and other foreign matter and also to prevent an excessive evaporation of ink when the machine is not in use, I provide a swinging cover —28— in the form of a U-shaped bar having the lower ends of its opposite arms hinged to the sides of the reservoir and its upper portion movable to and from a position directly over the open side of the recess —27—, so as to cover and uncover the inking pad.

Aside from the addition of the end pins —8— and mechanisms pertaining directly thereto and the specific features of the ink reservoir and correlated elements, the machine is substantially identical with that set forth in the patent referred to.

What I claim is:

1. In an instrument for centering, marking and testing lenses, a lens marking device having a series of marking points in the same straight line, and means for displacing and holding at least one of the said points from its operative position.

2. In an instrument for centering, marking and testing lenses, a lens rest, a mechanical marking device operative manually to and from the lens rest and having a plurality of marking points in a direct line to mark the horizontal axis of the lens, and means for displacing at least one of the points and holding it from its marking position.

3. In an instrument for centering, marking and testing lenses, a transparent lens rest, a sight tube, an ink pad and a marking device having a plurality of yielding marking pins normally disposed in the same straight line, and means for displacing and holding at least one of the pins from its marking position.

4. In an instrument for centering, marking and testing lenses, a lens rest, and a marking device movable to and from the lens rest and comprising a rotary head, a plurality of marking pins disposed in the same straight line and yieldingly mounted in said head, means for adjusting and holding the end pins out of their operative positions, and means brought into action by the movement of the head toward and from the lens rest for rotating said head with the pins thereon.

In witness whereof I have hereunto set my hand on this 18th day of November 1909.

WILLIAM MARTIN RICHARDS.

Witnesses:
HENRY SLATER,
A. G. H. AGHNER.

---

Copies of this patent may be obtained for five cents each, by addressing the "Commissioner of Patents, Washington, D. C."